June 26, 1945. J. H. BLANKENBUEHLER 2,378,894
GENERATOR
Filed July 24, 1943
Fig. 1.
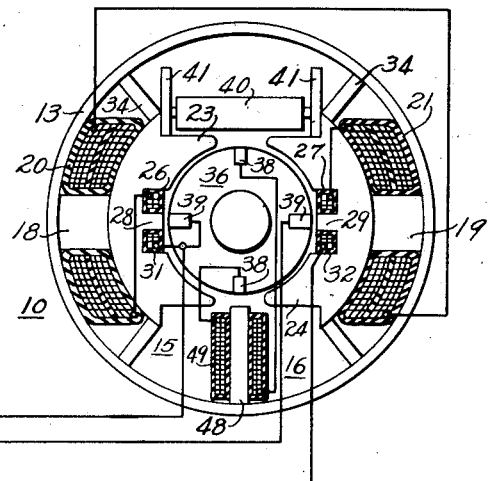
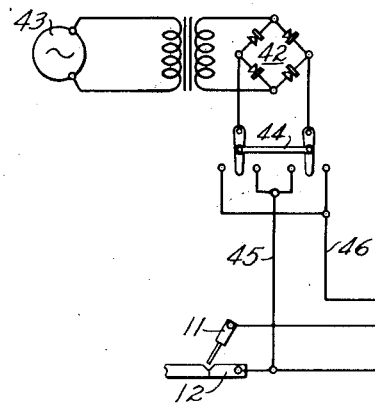
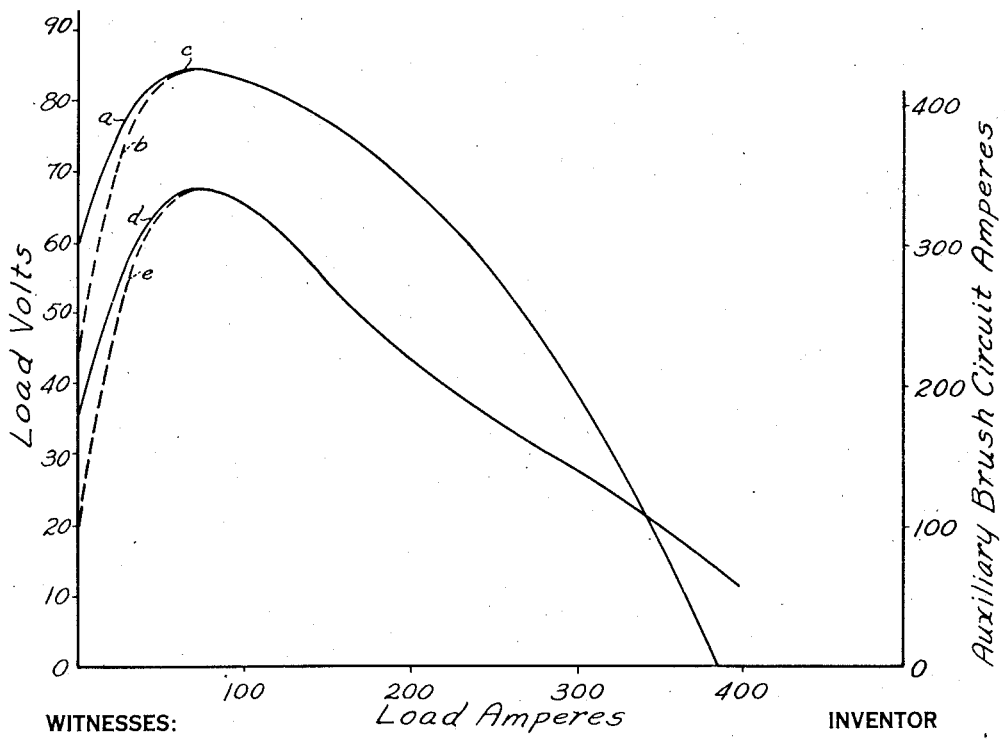
Fig. 2.
WITNESSES:
James F. Young
F. V. Giolma
INVENTOR
John H. Blankenbuehler.
BY
G. M. Crawford
ATTORNEY Patented June 26, 1945

2,378,894

UNITED STATES PATENT OFFICE 2,378,894

GENERATOR

John H. Blankenbuehler, Edgewood, Pa., assignor to Westinghouse Electric Corporation, East Pittsburgh, Pa., a corporation of Pennsylvania Application July 24, 1943, Serial No. 495,980

6 Claims. (Cl. 171—228)

My invention relates generally to generators, and it has reference in particular to arc welding generators of the cross-field type.

Generally stated, it is an object of my invention to provide in a simple and inexpensive manner for improving the arc welding characteristics of cross-field generators.

More specifically, it is an object of my invention to provide for increasing the open circuit arc striking voltage of arc welding generators of the cross-field type without causing undesirable commutating conditions at the auxiliary brushes.

It is also an object of my invention to provide for improving the commutating characteristics at the auxiliary brushes in a generator of the cross-field type.

Another object of my invention is to provide a simple method of increasing the open circuit voltage of existing generators of the cross-field type by providing sufficient auxiliary excitation of the field windings to increase the no-load circulating current in the auxiliary brush circuit, and utilizing a commutating pole positioned at the point of maximum armature potential relative to the main brushes for preventing undesirable commutation at the auxiliary brushes.

Yet another object of my invention is to provide increased auxiliary excitation of a field pole winding in a generator of the cross-field type and connect a commutating pole winding in the auxiliary brush circuit to neutralize the effect of the increased excitation on the commutation at the auxiliary brushes.

Other objects will in part be obvious, and will in part be explained hereinafter.

In practicing my invention in one form thereof, the auxiliary excitation usually applied to the series field windings of generators of the cross-field type for determining the polarity of the main load brushes is increased sufficiently to increase the open circuit voltage available at the main brushes, for the purpose of improving the arc striking characteristics of the generator. A commutating pole is positioned to one side of the armature substantially intermediate the main field pole members and is provided with a commutating winding connected in series circuit relation with the auxiliary brushes for neutralizing the otherwise harmful effects of the increased auxiliary excitation on commutation at the auxiliary brushes.

For a more complete understanding of the nature and scope of my invention, reference may be had to the following detailed description which may be read in connection with the drawing, in which:

Figure 1 is a diagrammatic view of an arc welding system embodying the principal features of the invention; and Fig. 2 represents load characteristic curves of a cross-field generator before and after embodying features of the invention.

Referring to Figure 1, the reference numeral 10 may denote generally an arc welding generator of the cross-field type which is arranged for supplying welding current to an electrode 11 for performing a welding operation on work 12.

The generator 10 may comprise, generally a frame 13 of magnetic material having field pole members 15 and 16 positioned therein in opposed relation. The field pole members comprise body portions 18 and 19, respectively, which are positioned adjacent the frame 13 and surrounded by series field windings 20 and 21. The body members 18 and 19 are preferably of a relatively small cross-section, so that they saturate at the values of welding current well below the normal range of welding current.

The field pole members may also be provided with enlarged arcuate shoe portions 23 and 24, respectively, having recessed central portions 26 and 27 with central projections 28 and 29, respectively, for accommodating compensating windings 31 and 32 in a manner well known in the art. Means, such as the supports 34, may be provided between the arcuate shoe portions and the frame adjacent the ends of the shoe portions to provide a more rigid mechanical structure. These supports are preferably of a non-magnetic material, such as brass.

The generator may be provided in the usual manner with an armature 36 positioned intermediate the arcuate shoe portions of the field pole members. Auxiliary brushes 38 may be provided for the armature, being positioned along an axis substantially perpendicular to the axis of the field pole members. Main brushes 39 may be positioned substantially along the axis of the field pole members and connected in series circuit relation with the series field windings 20 and 21, the compensating windings 31 and 32, the electrode 11 and work 12.

Suitable means may be provided in a manner well known in the art for controlling the output of the generator such as, for example, the magnetic shunt member 40 which may be supported adjacent the tips of the arcuate shoe members 23 and 24 and to one side of the armature 36 by support plates 41 which may be secured to the arcuate shoe portions. The support plates may be provided with suitable supporting surfaces inclined along and away from the longitudinal axis of the armature 36, so that the magnetic shunt member 40 may be moved toward or away from the armature 36 as it is moved along the supporting surfaces of the guide plates in a direction substantially perpendicular to the plane of the paper.

In order to prevent accidental reversal of the polarity of the generator 10, suitable auxiliary excitation may be provided for either one or both of the field pole windings 20 and 21, or an additional field winding connected to a source of auxiliary excitation may be provided in a manner well known in the art for maintaining the residual polarity of the field pole members in a predetermined direction. For example, a source of unidirectional current may be provided by connecting a rectifier bridge circuit 42 to a suitable source of alternating current 43 and utilizing a reversing switch 44, together with conductors 45 and 46, to connect the unidirectional source across the series field windings 20 and 21 and the compensating windings 31 and 32.

In order to provide for increasing the normal open circuit voltage available at the electrode 11 for striking an arc on the work 12, the amount of auxiliary excitation produced by the auxiliary source 41 may be increased to a value in excess of the usual polarity control excitation. In one instance, for example, with a cross-field generator of the type illustrated, I have found that, by increasing the voltage available at the auxiliary source 41 sufficiently to increase the auxiliary excitation of the series field windings 20 and 21 at no-load from approximately 10 to 16 amperes, it is possible to increase the open circuit voltage of the generator from 45 to 60 volts. This greatly improves the arc striking characteristics of the generator and improves the quality of the welds produced.

With an increase of the auxiliary excitation, the residual or no-load magnetic flux in the body portions of the field pole members 15 and 16 is increased correspondingly. Accordingly, the circulating current which flows in the auxiliary brush circuit due to the armature conductors cutting the residual magnetic flux when the generator is running at no-load, will be increased substantially in proportion. This increase of current in the auxiliary brush circuit creates an undesirable commutation condition at the auxiliary brushes resulting in arcing of the brushes.

In order to improve commutation at the auxiliary brushes, and to neutralize or compensate for the increased current in the auxiliary brush circuit, a commutating pole 48 may be positioned to one side of the armature 36, substantially intermediate the field pole members 15 and 16. A winding 49 may be positioned on the commutating pole 48 and connected in series circuit relation with the normally short-circuited auxiliary brushes 38. By providing the winding 49 with a number of turns approximately equal to two and one-half times the number of armature turns which are effective to produce a magnetic flux opposing that of the commutating pole 48, I have found that highly satisfactory operation of the generator may be secured even with the increased current in the auxiliary brush circuit.

It will be noted that the ratio of commutating field pole turns to opposing armature turns is substantially greater in the case of a cross-field generator than with generators of the usual type where it is common to operate with only one and one-quarter times the number of turns opposing armature turns on the commutating pole.

Since the cross-field type of generator is inclined to be relatively critical as to commutation even where the no-load voltage is not increased, and where polarity control excitation is not used, a commutating pole may be used to advantage in accordance with my invention. A symmetry of the air gap or misalignment of the field pole members, which usually result in substantial increases of no-load auxiliary brush current, can readily be neutralized by the use of a commutating pole which may be positioned intermediate the main field pole members on one side of the armature where a single magnetic shunt is used on the other side of the armature. In addition, lower grades of brushes may be used with a commutating pole, whether or not the current is increased, thereby affording an appreciable saving.

Referring to Fig. 2, the letter a designates a typical load characteristic or volt-ampere curve of a 300-ampere arc welding generator of the cross-field type embodying the features of the invention. The dotted curve b represents a typical load characteristic or volt-ampere curve of the same generator before embodying the features of my invention. It will be noted that the open circuit voltage of the generator has been increased from 45 to 60 volts, thereby greatly improving the arc striking characteristics of the generator.

Since the curves a and b merge at the point c where saturation of the body portions of the field pole members effectively determines the load characteristic curve, the load characteristics of a cross-field generator embodying the features of the invention are not affected within the normal operating range of the generator.

The curves d and e represent variations in the auxiliary brush circuit current corresponding to the different values of load current. Though the auxiliary brush current at no-load is increased from approximately 100 to 175 amperes, no harmful effects result therefrom in view of the neutralization effected by the commutating winding.

From the above description and the accompanying drawing, it will be apparent that I have provided in a simple and effective manner for improving the arc welding characteristics of generators of the cross-field type. The invention may be embodied in existing generators of the cross-field type, as well as incorporated into newly designed or manufactured generators. The improved arc welding characteristics may be obtained without material alteration of the generator and at a minimum of expense and labor. Such an improvement is relatively important when it is considered that, in order to obtain the same results by redesign of the machine itself, the number of armature turns, the size of the armature, the amount of iron therein, and also the overall size of the machine would have to be greatly increased to obtain the same results. Under the present conditions, when copper and iron are vital materials, it will be realized that the invention is a valuable aid to the conservation of these materials, as well as an important improvement to the welding generator, and a valuable contribution to the arc welding industry.

Since different embodiments of the invention may be made and certain changes may be made in the drawing and description without departing from the spirit and scope of the invention, it is intended that all the matter contained in the above description or shown in the accompanying drawing shall be construed as illustrative and not in a limiting sense.

I claim as my invention:

1. A generator comprising, a frame structure, an armature rotatably mounted in the frame structure and provided with main and auxiliary close-circuited brushes, a pair of field pole members supported by the frame structure having excitation windings thereon, circuit means providing sufficient auxiliary excitation to one of the said excitation windings to substantially increase the open circuit voltage of the main brushes, and an interpole structure positioned intermediate the field pole members on one side of the armature having a winding thereon connected between the auxiliary circuit brushes.

2. A cross-field generator comprising, a pair of opposed field pole members having excitation windings thereon, an armature rotatably positioned between the field pole members having main and auxiliary brushes, circuit means connecting at least one of the field pole excitation windings to a separate source of excitation, and an interpole structure positioned intermediate the field pole members having a commutating winding thereon connected in series relation with the auxiliary brushes to compensate for the auxiliary brush commutation conditions caused by the excitation of said field pole winding.

3. A generator of the cross-field type comprising, an armature having main and auxiliary brushes, a plurality of oppositely positioned field pole members having excitation windings connected in series circuit relation with the main brushes and a commutating pole positioned substantially at the point of maximum load circuit armature voltage having a winding connected in series circuit relation to the auxiliary brushes.

4. A generator comprising, an armature having a commutator with pairs of main and auxiliary brushes engaging the armature along axes 90 electrical degrees apart, a field structure supporting a pair of field pole members on opposite sides of the armature having windings connected in series circuit relation with the main brushes, and a commutating field pole member positioned substantially along the axis of the auxiliary brushes having a winding connected in series circuit relation with the auxiliary brushes.

5. An arc welding generator having an armature with main and auxiliary brushes, a pair of field pole members having excitation windings connected in series with the main brushes, circuit means connecting the field pole windings to a source of auxiliary excitation of sufficient voltage to raise the open circuit voltage of the main brushes, and a commutating pole positioned on one side of the armature substantially at the point of minimum armature voltage relative to the auxiliary brushes, said commutating pole being provided with a winding connected in series circuit relation with the auxiliary brushes to compensate for the increase in circulating current due to the increased excitation, said commutating winding having on the order of two and one-half times the armature turns opposing it.

6. A generator of the cross-field type comprising, an armature having pairs of main and auxiliary brushes positioned along axes 90 electrical degrees apart, a frame having opposed main field pole members with field windings thereon connected in series circuit relation with the main brushes, means including a reversing switch for applying sufficient auxiliary excitation to one of the field windings to increase the residual flux in the main field pole members whereby the no-load circulating current in the auxiliary brush circuit is increased sufficiently to produce the desired open circuit voltage, and means including a commutating field pole member intermediate the main field pole members having a commutating winding thereon connected in series circuit relation with the auxiliary armature brushes to correct undesirable commutation conditions produced by the effects of the auxiliary excitation at no load.

JOHN H. BLANKENBUEHLER.